United States Patent [19]

Carbon et al.

[11] Patent Number: 5,299,492
[45] Date of Patent: Apr. 5, 1994

[54] MULTIPLE VERTICAL BAKER FOR WAFFLES AND PANCAKES

[76] Inventors: Donald A. Carbon, 4047 Wildon Ct., Buchanan, Mich. 49107; Richard F. Green, 5115 Lake LeClare, Lutz, Fla. 33549

[21] Appl. No.: 956,381

[22] Filed: Oct. 5, 1992

[51] Int. Cl.$^5$ .......................... A21B 5/02; A47J 37/00
[52] U.S. Cl. ........................................ 99/373; 99/374; 99/377; 99/378; 99/380; 219/524
[58] Field of Search .................. 99/372, 373, 326, 327, 99/331, 332, 374, 375, 376, 380–384, 377, 378, 379; 219/524; D7/352

[56] References Cited

U.S. PATENT DOCUMENTS

| | | | |
|---|---|---|---|
| 270,659 | 1/1883 | Griswold et al. | 99/377 |
| 1,117,929 | 11/1914 | Turnbull et al. | 99/373 |
| 1,546,347 | 7/1925 | Simmons | 99/373 |
| 2,207,264 | 7/1940 | Newberger | 99/373 |
| 4,075,940 | 2/1978 | Carbon | 219/524 |
| 4,401,015 | 8/1983 | Ziegler | 99/374 |
| 4,476,379 | 10/1984 | Andrizzi | 219/524 |
| 4,803,918 | 2/1989 | Carbon et al. | 99/377 |
| 4,967,650 | 11/1990 | Weigle | 99/374 |
| 4,970,949 | 11/1990 | Ferrara, Jr. et al. | 99/378 |
| 5,142,967 | 9/1992 | Herting | 99/380 |

FOREIGN PATENT DOCUMENTS 235895 1/1925 United Kingdom .................. 99/373

*Primary Examiner*—Timothy F. Simone
*Attorney, Agent, or Firm*—James D. Hall; Thomas J. Dodd; R. Tracy Crump

[57] ABSTRACT

A multiple baker for confectionery items such as waffles and pancakes having multiple baking irons vertically mounted between vertical heating partitions of a base and pivotally hinged to the base for rotation in a vertical plane, between a baking position and an offset position. Each baking iron has separatable shell members for receiving the food items and a flanged mouth positioned atop each baking iron when in the baking position. The position of the flange mouth allows steam to escape vertically during the baking process and distance the user from the steam.

20 Claims, 9 Drawing Sheets

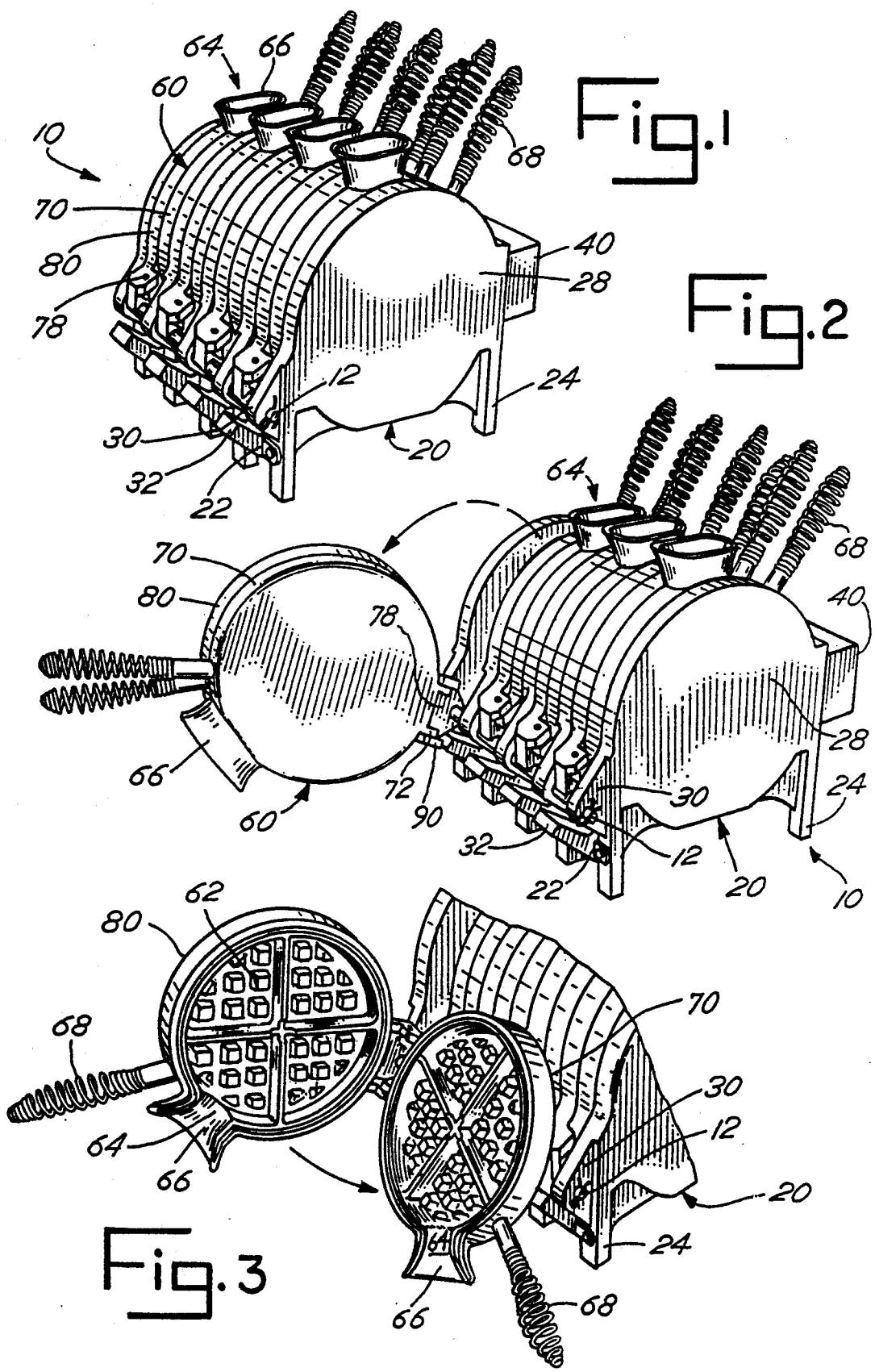

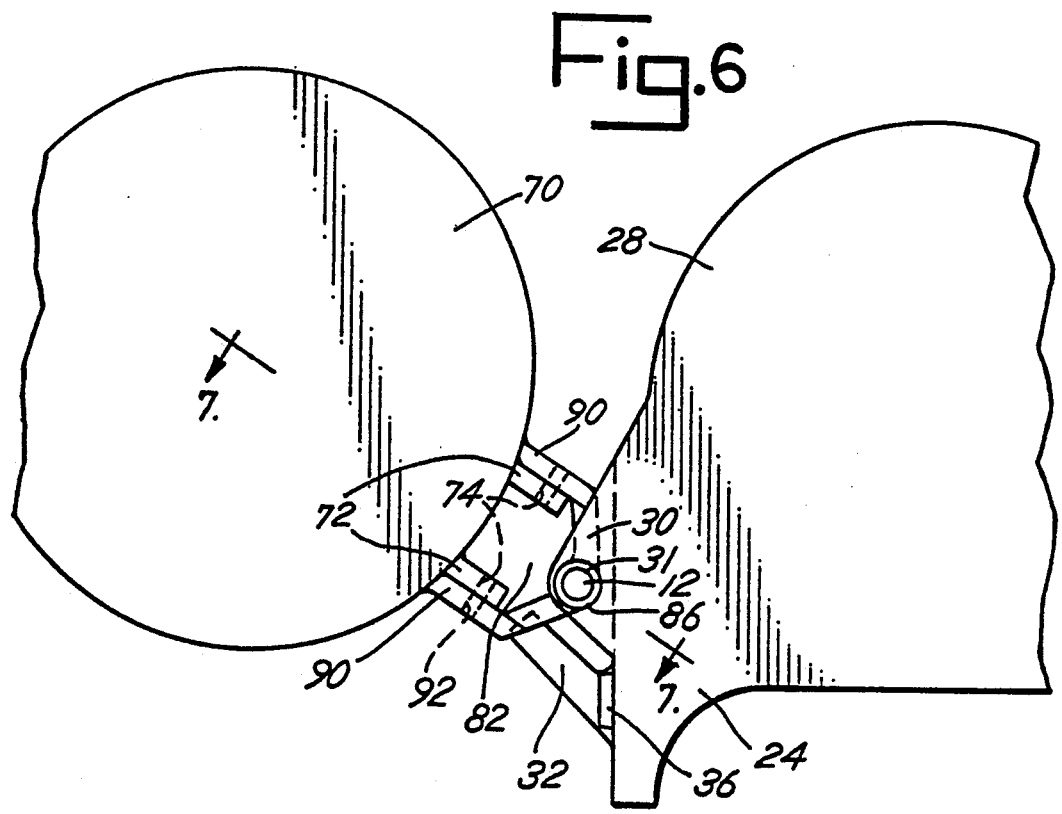
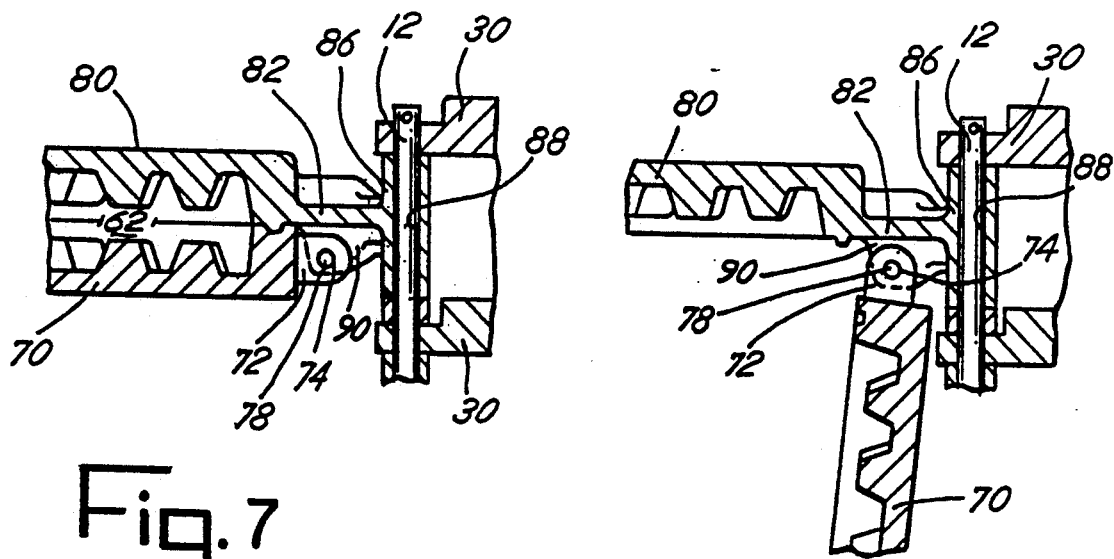

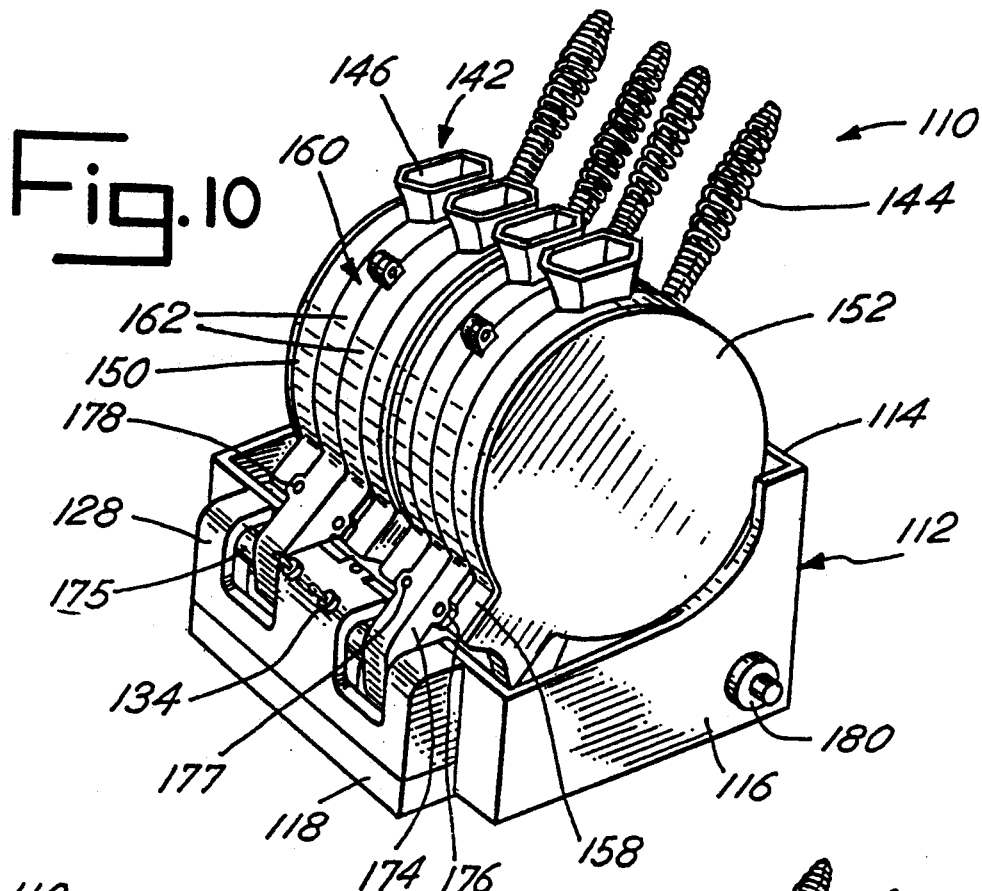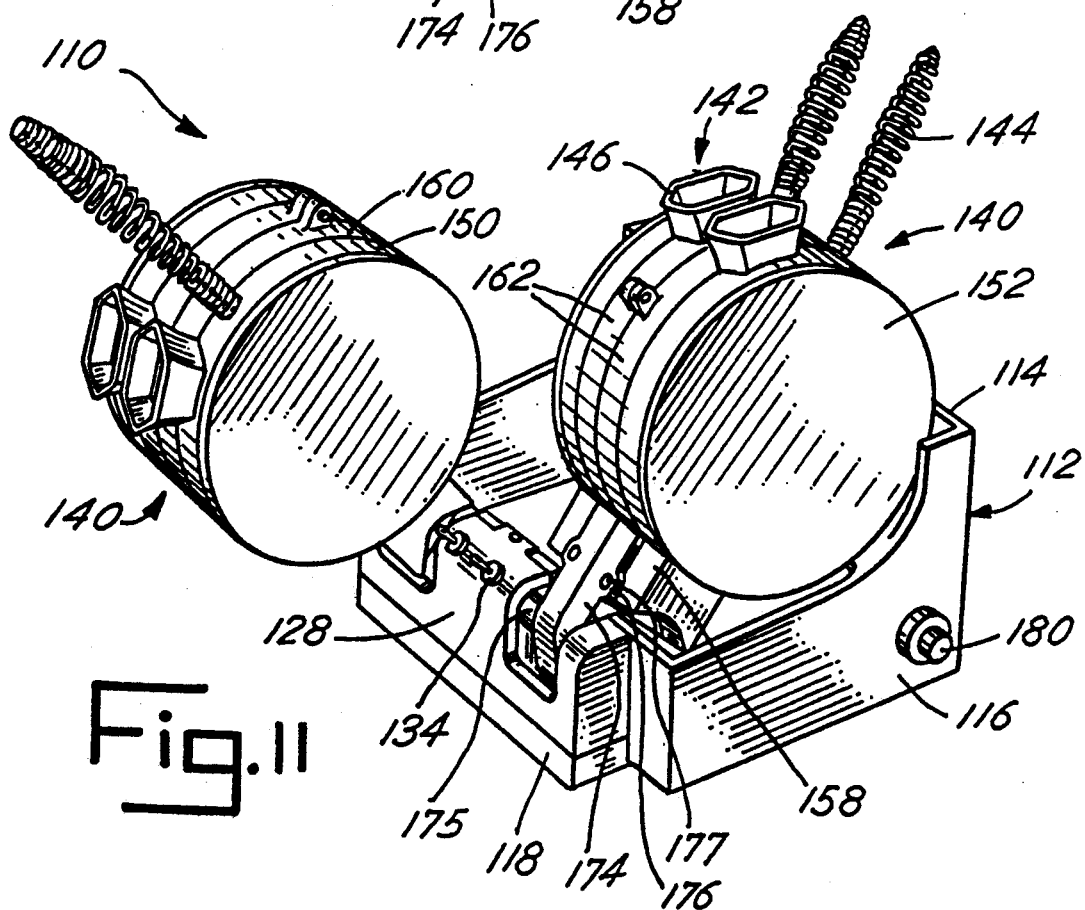

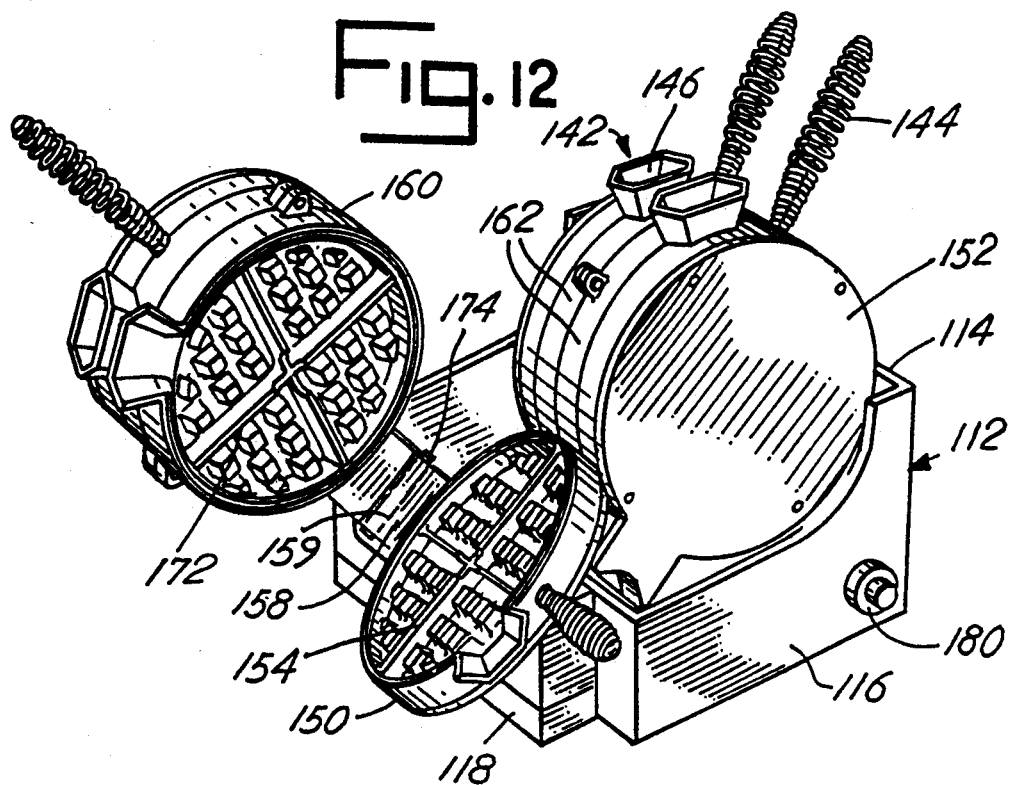
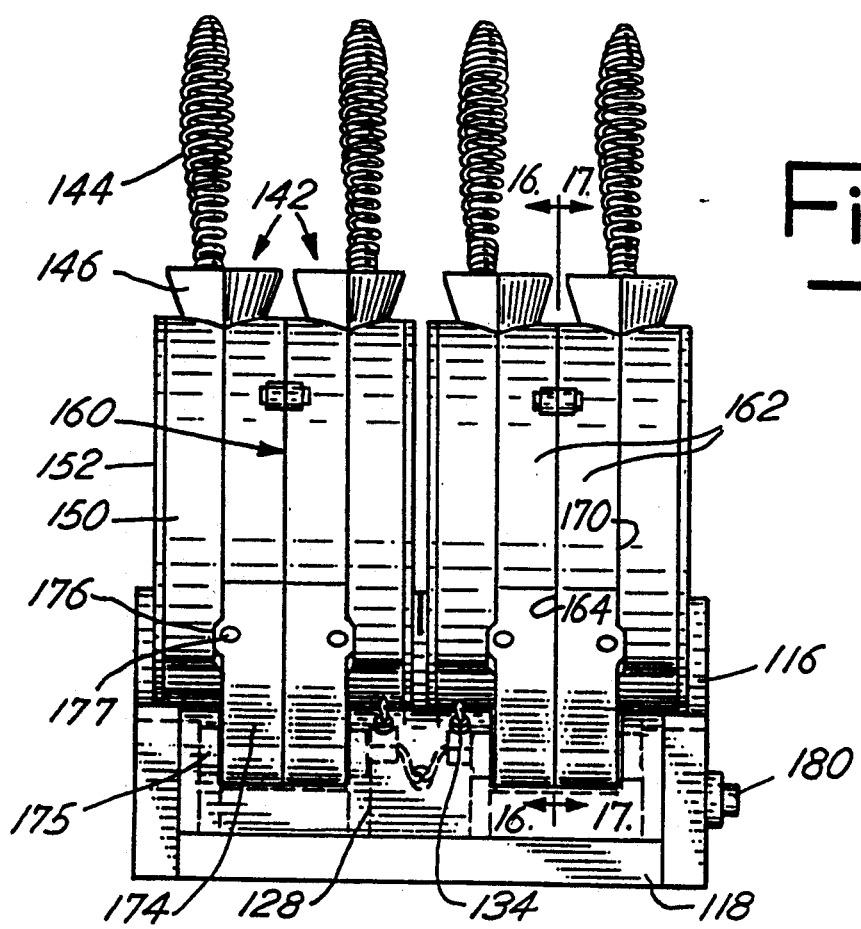

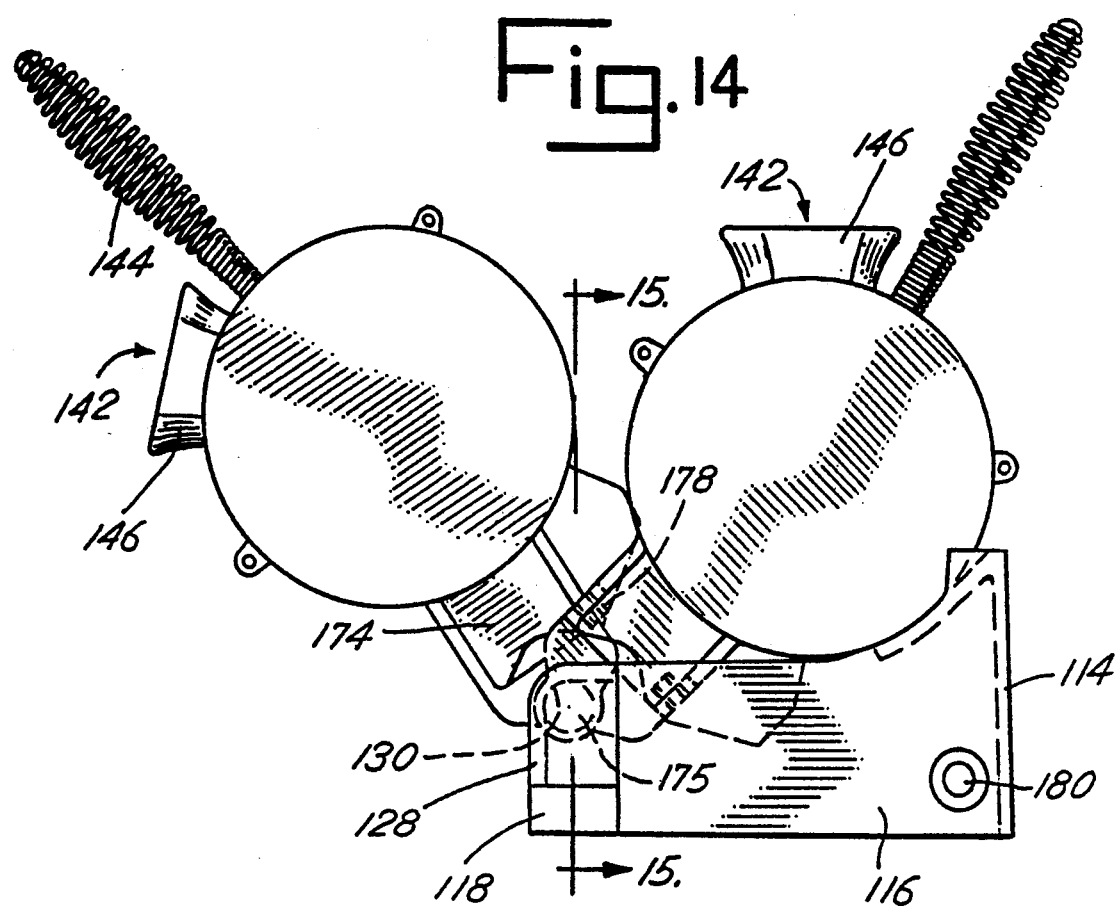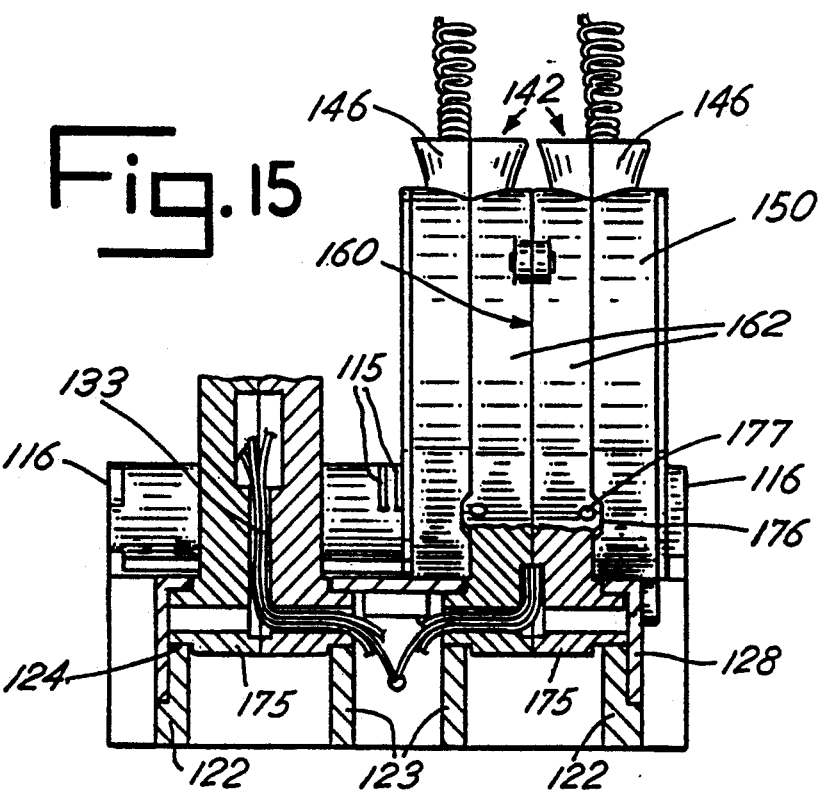

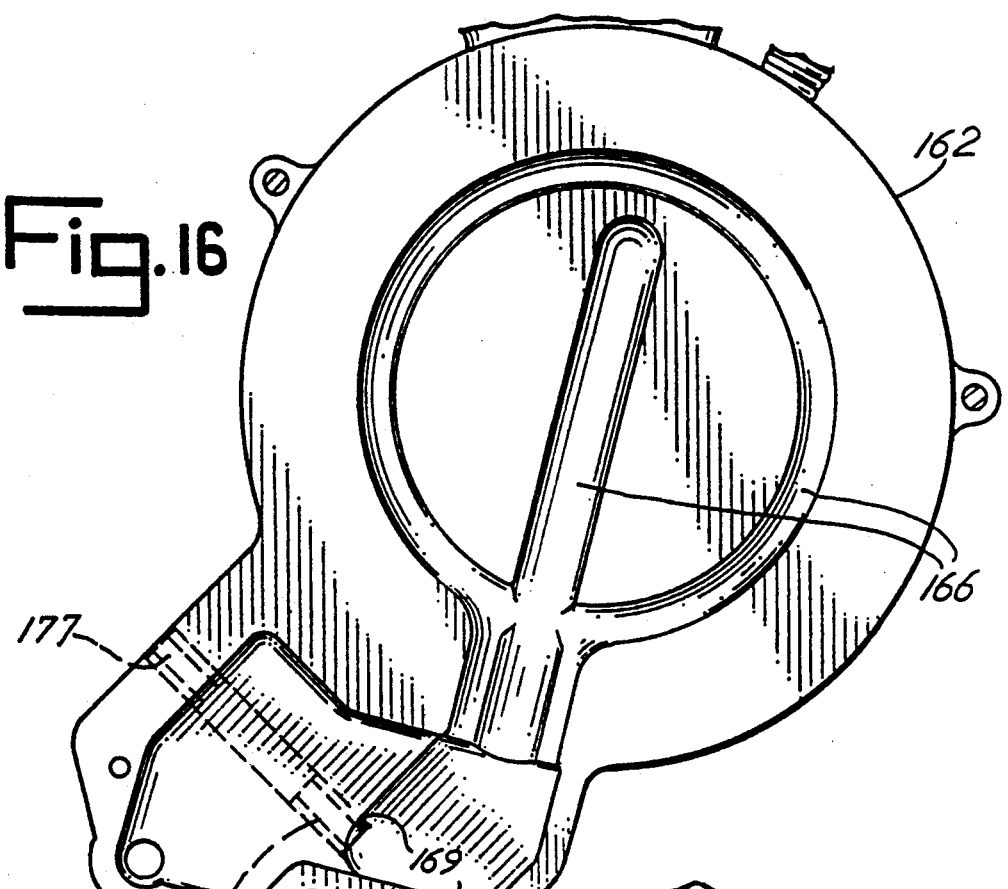
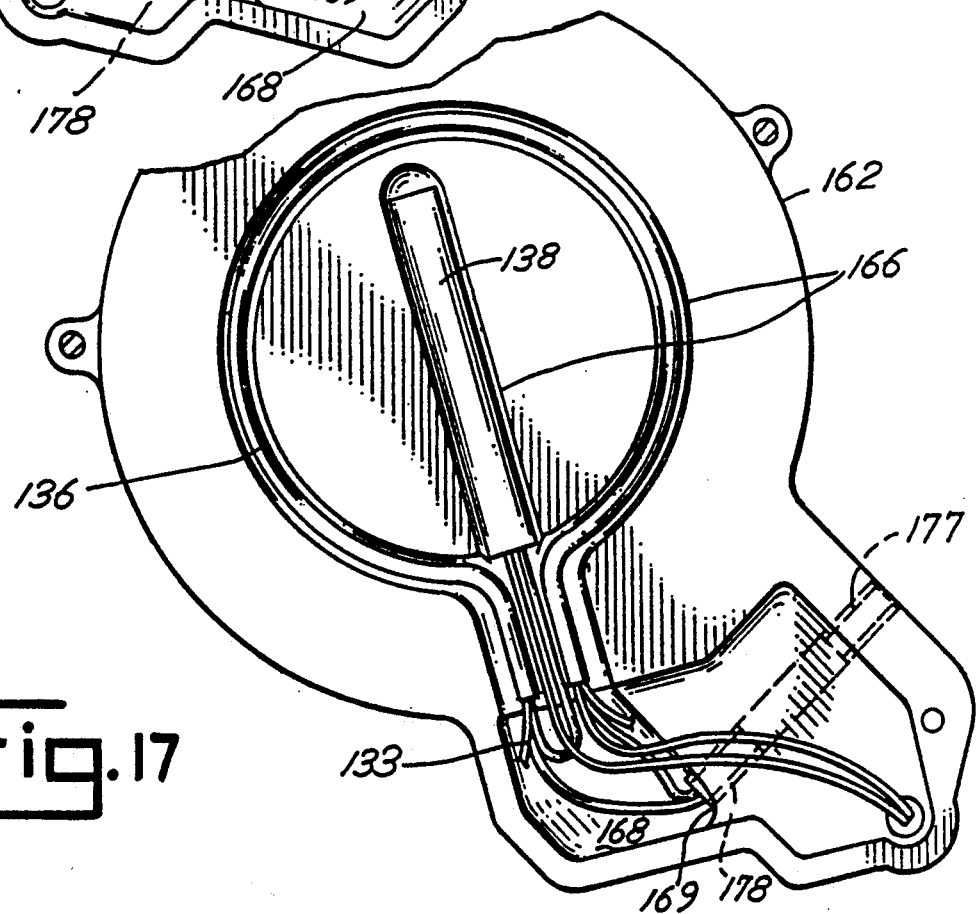

MULTIPLE VERTICAL BAKER FOR WAFFLES AND PANCAKES

This invention relates to a baker and will have special application for simultaneously baking multiple waffles, pancakes and similar food items.

HISTORY OF THE INVENTION

Bakers for waffles and pancakes have been well disclosed in various patents including U.S. Pat. Nos. 4,075,940 and 4,803,918. Generally, the waffle bakers includes a pair of shell members one or both of which contain heating elements. The food items are baked between the shell members in a substantially horizontal orientation. During the cooking process, the food items release steam, which escapes about the edge of the shell members. The steam can cause uneven baking and may create a burn hazard for the users of the baker. Even when the heating elements are embedded directly in both top and bottom shell members, to facilitate uniform baking, the shell member must be rotated 180 degrees to allow steam to escape evenly. The rotating of the shell member requires twisting electrical wiring and limits the number of baker designs and applications.

SUMMARY OF INVENTION

Both embodiments of this invention use multiple vertically oriented baking irons. The baking irons carry separable hinged shell members. When closed in a facing relation, the hinged shells form a concave food receiving cavity with an opening and flanged mouth for accepting the liquid raw food mix. The mouth is located at the top of the baking irons when the baking irons are in the upright baking position. The flanged mouth and opening at the top of the baking irons allow the steam to escape during the baking process, providing uniform baking of the food mix inside the baking irons. Locating the flange mouth and opening at the top of the baking irons also distances the escaping steam from the user. The baking irons can be pivoted downward to a position offset from the base. In the offset position, the shell members may be pivoted or swung apart to allow the baked food item to be removed.

In one embodiment, the base is constructed of connected individual vertical sections with space between to accommodate a baking iron. The vertically oriented heating partitions contain heating elements. The base sections are connected to form an elongated multiple base. The connected base sections are connected in series by electrical wiring within a wire housing across the rear of the baker. The heating coils inside each partition are connected in series to several on/off switches. The baking irons are interposed between the heating partitions in a vertical orientation and pivotally mounted to the base by a rod. The baking irons pivot about the rod in a vertical plane between a baking position and an offset position. The vertical orientation also allows multiple base sections and baking irons to be added in series for increased production. The on/off switches allow each baking iron to operate independently of the others, thus permitting several baking irons to be baking at any given time.

In a second embodiment, the base is comprised of a singular rectangular frame supporting a plurality of dual sided baking irons and a frontal wiring housing. Each baking iron carries two outer shell members and an inner shell member with each shell member carrying its own heating element. The baking irons pivot about a trunnion yoke by cradle parts on the base and a front cover plate between a baking position and an offset position as with the first embodiment. With the baking irons in the offset position, each outer shell member can be swung away from the inner shell member independently.

Accordingly, an object of this invention is to provide a novel and unique baker for confectionery food items such as waffles and pancakes.

Another object of this invention is to provide a multiple baker for waffles and pancakes.

Another object of this invention is to provide a baker with vertically oriented pivotal baking irons.

Other objects will become obvious upon a reading of the following specification taken along with the drawings.

BRIEF DESCRIPTION OF THE DRAWINGS

FIG. 1 is a perspective view of the first embodiment of the baker with all the shell members thereof in their closed or baking positions.

FIG. 2 is a perspective view of the first embodiment of the baker with one of the baking irons in the offset position.

FIG. 3 is a perspective view showing the shell members of one of the baking irons in an open position.

FIG. 6 is an end view of the first embodiment of the baker with one of the baking irons in the down or offset position.

FIG. 7 is a fragmentary sectional top plan view of the hinge parts of one of the baking irons taken along line 7—7 of FIG. 6.

FIG. 8 is a fragmentary sectional view of the hinge parts of the baking iron of FIG. 7 in an open position.

FIG. 10 is a perspective view of the second embodiment of the baker with all the shell members thereof in their closed or baking position.

FIG. 11 is a perspective view of the second embodiment of the baker with one baking iron in the offset position.

FIG. 12 is a perspective view of the second embodiment showing one outer shell of the baking iron in the open position.

FIG. 13 is a frontal view of the second embodiment of the baker with all the baking irons in an upright position.

FIG. 14 is an end view of the second embodiment with one baking iron in the offset position.

FIG. 15 is a fragmentary front plan view taken along line 15—15 of FIG. 14.

FIG. 16 is a side view of one of the halves of one of the inner shell members of the second embodiment.

FIG. 17 is a side view of one of the complimentary halves of the inner shell member showing the wiring connected to the heating coil and thermal sensor.

DESCRIPTION OF THE PREFERRED EMBODIMENT

The preferred embodiment herein described is not intended to be exhaustive or to limit the invention to the precise form disclosed. It is chosen and described to illustrate the principles of the invention and its application and practical use to allow others skilled in the art to follow its teachings.

Figure 4:
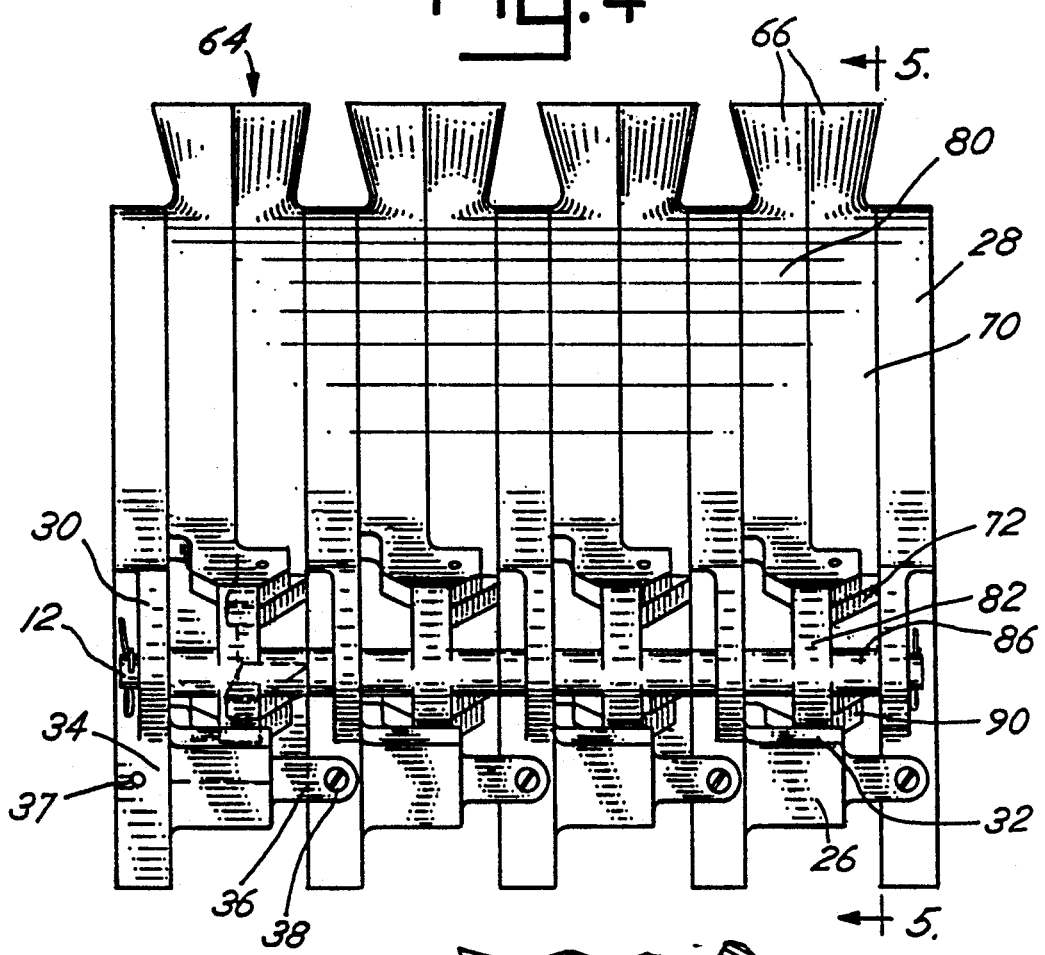
FIG. 4 is a frontal view of the first embodiment of the baker with all the baking irons in an upright position.
Figure 9:
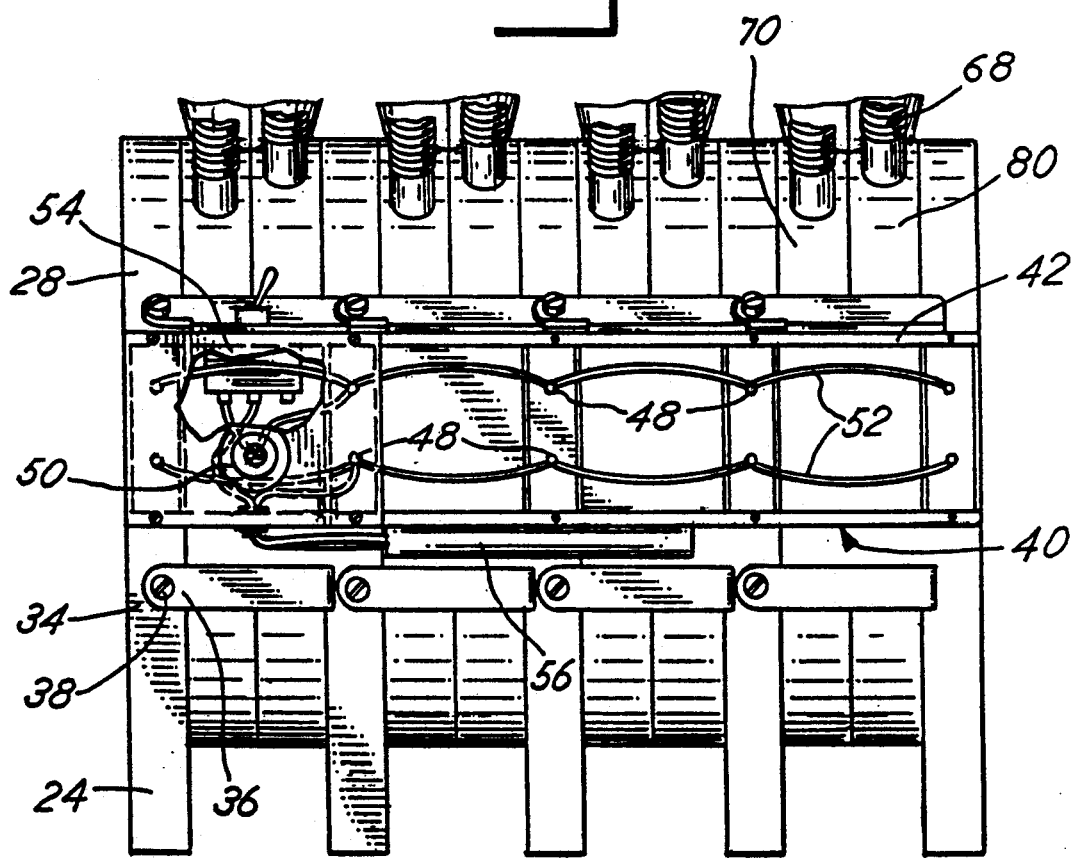
FIG. 9 is a rear and elevational view of the first embodiment of the baker.

FIGS. 1–9 show one embodiment of the baker of this invention. In this embodiment, four baking irons are illustrated in tandem, but it will be understood that this is by way of example and not restrictive. Baker 10 of this embodiment has base 20 carrying four pivotal baking members or irons 60. Base 20 is constructed of five connected base sections 22 as seen in FIGS. 1–4 and 9. Each base section 22 is preferably formed of a heat conductive metallic composition, such as cast aluminum or iron. Each base section 22 includes a vertical partition 28 with two integral legs 24, and ear 30 extending outward from partition 28. Ear 30 has a lateral through bore 31. Integral front cross member 26 and a U-shaped rear cross member 42 extend from one side of partition 28. A stop member 32 protrudes upwardly and outwardly from front cross brace 26. The front and rear brace members 26 and 42 each have connecting shoulders 34 and tabs 36. As best shown in FIGS. 4 and 9, the base sections 22 are connected by shoulders 34 and tabs 36. The connecting tab 36 of one base section 22 mates within connecting shoulder 34 of an adjacent base section 22. A fastener 38, such as a bolt or screw, is threaded through tabs 36 into threaded bore 37 in shoulders 34. Thus multiple base sections 22 can be connected in series to form an elongated base 20 for multiple baking. With base sections 22 connected, rear cross braces 42 form an elongated U-shaped wiring housing 40 defining an interior wiring area 46 with an open outer face. A series of cover plates 44 encloses wiring area 46.

Electrical heating elements or coils 29 are cast inside the thermal conductive material of each partition 28 for heating partition 28. Each partition 28 serves as a heating element to baking irons 60. Heating coils 29 have electrical coil leads 48 which extend outwardly through partition 28 into wiring area 46.

Figure 5:
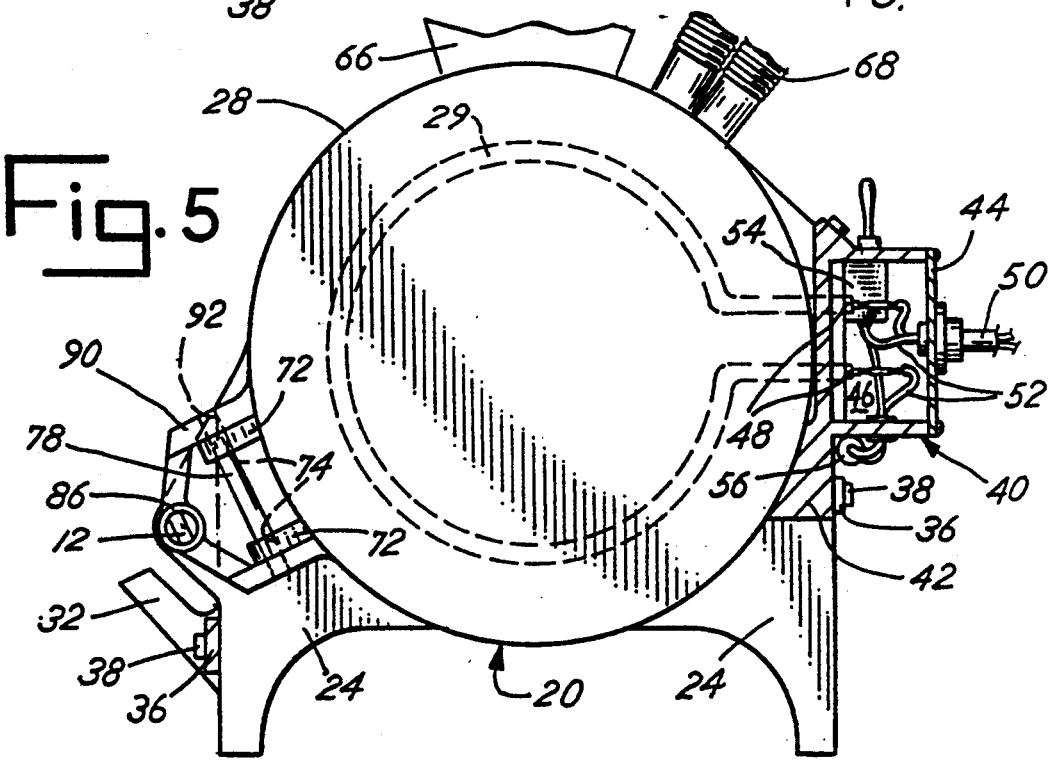
FIG. 5 is an end view of the first embodiment of the baker taken along lines 5—5 of FIG. 4.

As shown in FIGS. 5 and 9, an electrical power cord 50 passes through an opening in one of the cover plates 44 into wiring area 46. One end of cord 50 includes a suitable plug (not shown) by which the cord can be connected into an electrical outlet (not shown). Wiring 52 from cord 50 electrically connects to coil lead 48 of each heating coil. Wiring 52 also connects to thermal sensor 56 which monitors the partitions from overheating. Multiple on/off switches 54 can be mounted and connected to allow the user to limit the number of partitions heated when baker 10 is not used in full production. For illustration, this embodiment shows one switch controlling power to all five partitions.

Baking irons 60 are preferably formed of a heat conductive metallic composition, such as cast aluminum or iron. As shown in the Figures, baking irons 60 have a round configuration, but other shapes and configurations can be used to produce various shape food items. Each baking iron 60 includes receiving opening 64 with a flanged mouth 66 and a pair of upright shell members 70 and 80 each with a handle 68 and a concave food receiving part 62. Opening 64 is formed in each shell member 70, 80 at its top. If baker 10 is to be utilized for the cooking of waffles, each food receiving part of shell members 70 and 80 will be sectioned as shown in the drawings. The grid pattern which produces the waffle appearance of shell members 70 and 80 can be varied by replacing the individual shell member or incorporating separate interchangable grid plates into the design.

As shown in FIGS. 6–8, shell member 80 has a flat hinge part 82 extending from the body of shell member 80, a pivot sleeve 86, extending hinge part 82 and a pair of parallel spaced ears 90. Pivot sleeve 86 has a bore 88 extending axially through the length of sleeve 86 and hinge part 82. Ears 90 have a spaced coaxial central eyelet 92. Shell member 70 has a pair of spaced ears 72 with central coaxial eyelets 74. Shell members 70 and 80 are joined for pivotal movement by a pin 78 inserted into eyelets 74 of ears 72 of shell member 70 and eyelets 92 of ears 90 of shell member 80. With shell members 70 and 80 so connected together, shell member 70 can be pivoted from a closed position with shell members 70 and 80 in a face relationship as shown in FIGS. 2 and 7 to an open position with the shell member spaced apart as shown in FIGS. 3 and 8.

Baking irons 60 are pivotally mounted to base 20 by rod 12. Rod 12 extends across the length of baker 10 through bore 31 of ears 30 in each partition 28 and pivot bores 88 of each pivot sleeve 86 of shell member 80. Baking irons 60 pivot vertically about rod 12 between a baking position interposed between partitions 28, as shown in FIG. 1, and an offset position, as shown in FIG. 2. The rotation of baking irons 60 is limited in the rear by rear cross brace 40, such that the baking irons are positioned in an upright position. Stop 32 limits the forward rotation of baking irons 60 at rest in the down position.

FIGS. 10–18 shows a second embodiment using the vertically oriented baking irons only two of which are shown, for illustration and not restriction. As shown in FIGS. 10–13, baker 110 includes a rectangular horizontal base which pivotally supports a pair of dual sided baker members or irons 140. Again, baking irons 140 have a round configuration, but the configuration can vary to accommodate different shaped food items. Each baking iron 140 has an upright inner shell member 160 and two upright outer shell members 150. Outer shell members 150 include a concave food receiving part 154, cover plate 152, a handle 144 and end body 158. End body 158 has through bore 159 into which is inserted pin 174, allowing outer shell members 150 to pivot away from inner shell member 160 about pin 174 (only seen in FIG. 12). Cover plate 152 encloses heating elements or coils 136 retained inside outer shell member 150.

Inner shell member 160 has two connected halves 162. Each halve 162 has opposing and abutting faces. Opposing face 170 includes concave food receiving part 172 and hinge part 174. Hinge part 174 supports a pair of parallel spaced ears 176 with eyelets 177 and hollow trunnion 175. Abutting face 164 includes recesses 166 in both abutting shells 160 for accepting heating coils 136 and thermal sensor 138 and wire cavity 168. Wire cavity 168 has passage 169 for access to hollow pins 178. Halves 162 are fastened together by bolts or other methods with heating coils 136 and thermal sensor 138 interposed between halves 162 inside recesses 166.

Outside shell members 150 and inner shell member 160 are connected by hollow pins 174. Pins 174 extend through eyelets 169 of halves 162 of inner shell member 166 and bore 159 of end body 158 to allow each outer shell member 150 to pivot between a closed position, as shown in FIG. 11, and an open position, as shown in FIG. 12. In the closed position, food mix receiving parts 154 and 172 of shell members 150 and 160, respectively, are in opposed relationship to form a cavity for the baking of the food mix. The tops of shell members 150 and 160 also define a receiving opening 142 for accessing the food receiving parts. Flange mouths 146 extend about and form opening 142. In the open position, outer shell members 150 are pivoted or swung away from inner shell member 160 to expose the food receiving parts 154 and 172 to remove the cooked or baked food mix. In this manner, each of outer shell members 150 can pivot about pins 174 towards and away from inner shell member 160 independently of the other outer shell member 150.

Base 112 includes back wall 114 and side walls 116. Side walls 116 also support timer 180. The front of base 112 has a flat horizontal cross plate 118 which supports four spaced vertical partitions, two end located 122 and two centrally positioned 123. The two centrally positioned partitions 123 are connected by back housing wall 126 to form central wiring housing 120. Partitions 122 and 123 each have cooperating cradle parts 124. Cover plate 128 mounts over partitions 122 and 123 across the front of base 112. Base cover plate 128 has interior shoulders 130 which correspond to and cooperate with cradle parts 124 to form four generally circular openings.

The hinge-connected baking irons 140 are pivotally supported upon base 112 by trunnion 175 yoked between the shoulders 130 of base cover plate 128 and cradle part 124 of partitions 122 and 123. Retained between shoulders 130 and cradle parts 124, trunnion 175 allows baking irons 140 to be pivoted about a vertical plane between a baking position overlying base 112, as shown in FIGS. 10 and 13, and an offset position shown in FIGS. 11, 12 and 14. From the offset position, outside shell members 150 can be moved between the open and closed positions illustrated in FIG. 12. In the baking position, sides 116 and tabs 115 extending from back wall 114 prevent outside shell members 150 from moving away from inner shell member 160. Tabs 115 are best seen in FIG. 15. In the baking position, receiving opening 142 and flanged mouth 146 is positioned at the top of baking irons 140.

Figure 18:
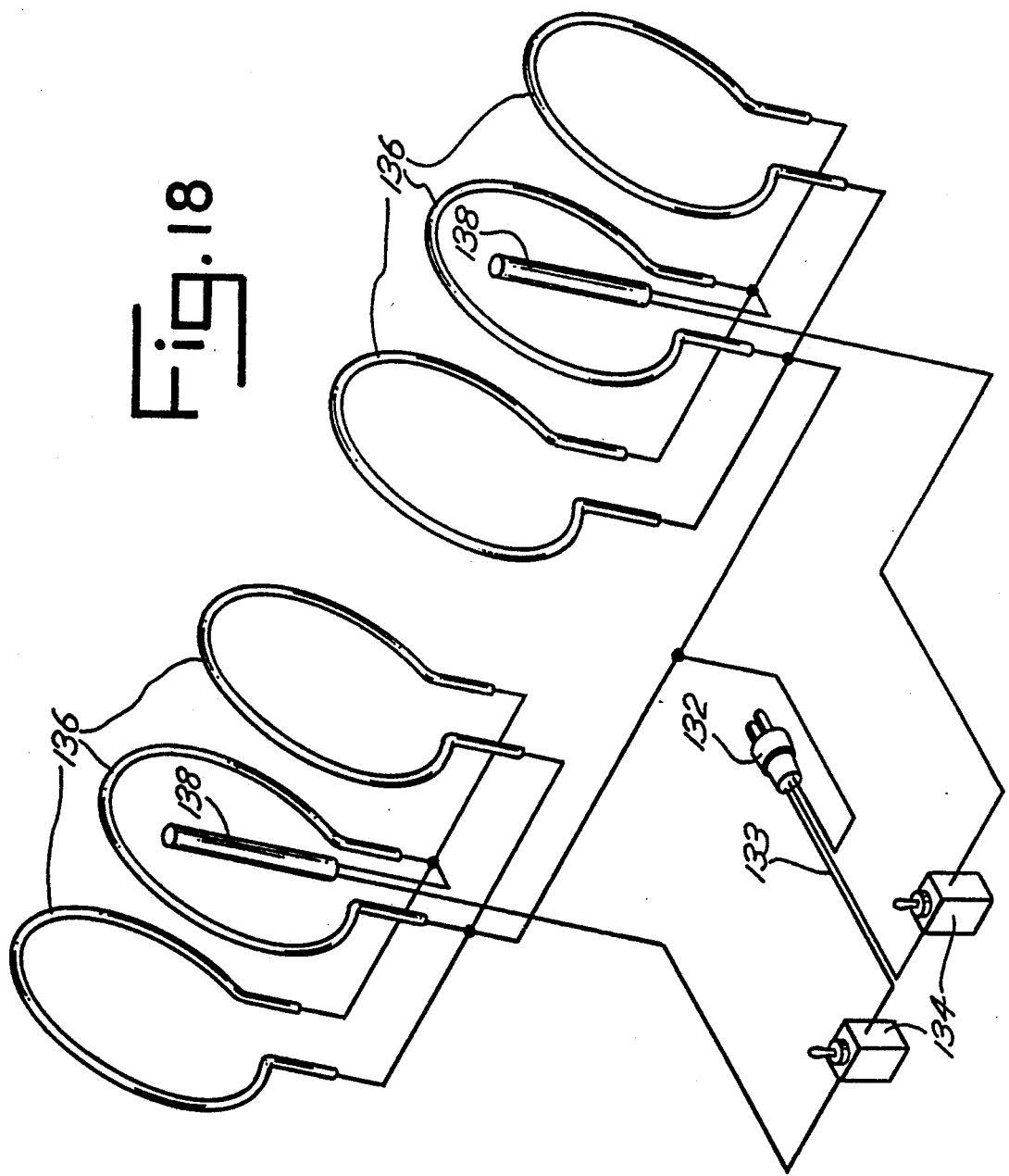
FIG. 18 is a schematic of the electrical configuration with the heating coils and thermal sensors of the second embodiment.

Power cord 132 enters through the back wall 114 of base 112 (not shown), and passes beneath baking irons 140 and into control housing 120 between partitions 123 (See FIG. 15). Cord 132 contains electrical wiring 133 which provides an electrical connection with heating coils 136, as shown in FIG. 18. On/off power switches 134 are mounted in base cover plate 128 and conventionally interposed in wiring 133. After connection with switch 134, electrical wiring 133 passes through hollow trunnion 175 into wiring cavity 168 of halves 162. Wiring 133 connects with heating coils 136 and thermal sensor 138 interposed between halves 162. From heating coils 136 and thermal sensors 138 between halves 162, wiring 137 pass through hollow pins 178 into end bodies 158 of outer shell 150. Wiring 133 passes through end body 158 and connects with the enclosed heating elements 136 inside outer shell member 150.

Both embodiments of this invention operate as follows:

Electrical current supplied from the power cord, wiring and switches heats the heating coils. The heat from the coils is transferred through the partitions to the shell members of the baking irons, as in the first embodiment, or directly from within the shell members, as in the second embodiment. With the shell members preheated to a suitable baking temperature, the liquid raw food mix can be poured into the food receiving parts. In the baking position, the baking irons are in an upright position directly above the base and the receiving openings and flange mouths are in the upper most vertical position.

The raw food mix is poured through the flanged mouth and receiving opening into the food receiving part. The temperature of the shell members is such that the raw food mix forms a crust layer against the concave receiving parts, which prevents the raw food mix from leaking out of the seams between the vertically oriented shell members. At the point at which the raw food mix initially encounters the heated shell members is where the greatest amount of steam is generated. Rather than form bubbles in the mix, the steam rises upwardly through the receiving opening. As the raw food mix bakes, a certain amount of steam continues to vent upwardly through the receiving opening. The positioning of the receiving opening atop of the baking irons distances the escaping steam from the users and provides for uniform baking.

When the baking of the food item has been completed, the baking irons are pivoted downward into the offset position by grasping and pulling the handles. By grasping and spreading the handles, the shell members can be spaced apart to remove the baked food item. With the baked food item removed, the shell members are closed and returned to the upright baking position to receive additional food mix.

Although the invention has been described and illustrated in detail, it is to be clearly understood that the same is intended by way of illustration and example only and is not to be taken by way of limitation. The preferred embodiment may be modified without departing from the scope of the invention as defined in the claims.

What I claim is:

1. A baker for waffles, pancakes and similar food items, said baker comprising:
   a base, a baking member having components pivotally separatable about a first axis supported upon said base and including inlet means for accepting a liquid food item mix poured therethrough into said baking member, pivot means connecting said baking member to said base for pivotally supporting said baking member between a baking position overlying said base and an off-set position relative to said base whereby said food item mix may be removed in a baked form from said baking member when its said components are separated, said inlet means being located in an upward orientation relative to said base and baking member when said baking member being in its said baking position to allow said food item mix to be poured therethrough into the baking member, said pivot means being shiftable in a vertical plane about a second axis.

2. The baker of claim 1, wherein said baking member includes first and second upright shell parts, and means for heating said baking member when said baking member is in said baking position with said food mix therein, each shell part includes a concave food item mix receiving part and hinge means for cooperating pivotal connection about an axis between a closed position in which said food item mix receiving parts overlie one another to form an enclosed baking cavity and an open position in which said shell parts are separated at said food item mix receiving parts thereof, said base including heating means extending along the side of one of said first and second shell parts.

3. The baker of claim 1, wherein said baking member component include first and second upright shell parts each having a hinge part and a concave food item mix receiving part, said shell parts having their respective hinge parts in a cooperating relationship and being pivotal about said first axis between a closed position in which said food item mix receiving parts overlie one another to form an enclosed baking cavity and an open position in which said shell parts are separated at said food item mix receiving parts.

4. The baker of claim 1, wherein said baker includes means for heating said baking member when the baking member is in its said baking position with said food item mix therein.

5. The baker of claim 4, wherein said base includes said heating means in a juxtaposed location along said baking member.

6. The baker of claim 4, wherein said baking member includes heating means within at least one of said shell parts.

7. The baker of claim 3, wherein said inlet means is an opening into said baking cavity, at least one of said shell parts defining at least a part of said opening.

8. The baker of claim 7, wherein each shell part defines a part of said opening.

9. The baker of claim 8, wherein each shell part includes a flange, said flange of said first shell part cooperating with said flange of said second shell part to define funnel means into said opening for receiving said food item mix.

10. The baker of claim 4, wherein said pivot means includes passage means extending therethrough for receiving wiring means, said wiring means for conduction of an electrical current to said heating means and extending through said pivot means to the heating means.

11. A baker for waffles, pancakes and similar food items, said baker comprising:
a base; a baking member supported upon said base and including inlet means for accepting a liquid food item mix poured therethrough into said baking member; pivot means connecting said baking member to said base for pivotally supporting said baking member between a baking position overlying said base and an off-set position relative to said base whereby said food item mix may be removed in a baked form from said baking member; said inlet means being located in an upward orientation relative to said base and baking member when said baking member being in its said baking position to allow said food item mix to be poured therethrough into the baking member; said baking member including first and second upright outer shell parts, each having a hinge part, a handle part and a concave food mix receiving part, and an upright inner shell part having a hinge part and oppositely located concave food receiving parts; said inner shell part positioned between said first and second outer shell parts with said respective hinge parts interconnecting said shell parts to enable each of said first and second outer shell parts to be pivoted about an axis through said hinge parts relative to said inner shell part between a closed position overlying said inner shell part with said concave food mix receiving part of the outer shell part overlying a said concave food mix receiving part of said inner shell part to form an enclosed baking cavity and an open position spaced from said inner shell part.

12. The baker of claim 11, wherein said shell parts each having a top, said inlet means includes a first opening into said overlying food receiving parts of said first outer shell part and said inner shell part with at least one of said first outer shell part and said inner shell part defining at said top thereof at least a part of said first opening, and a second opening into said overlying food receiving parts of said second outer shell part and said inner shell with at least one of said second outer shell part and said inner shell part defining at said top thereof at least a part of said second opening.

13. The baker of claim 12, wherein each first outer shell part and inner shell part defines a part of said first opening, each second outer shell part and inner shell part defines a part of said second opening.

14. The baker of claim 13, wherein each first outer shell part and inner shell part includes a first flange, said first flange of said first outer shell part cooperating with said first flange of said inner shell part to define funnel means into said first opening for receiving said food item mix, each second outer shell part and inner shell part include a second flange, said second flange of said second outer shell part cooperating with said second flange of said inner shell part to define funnel means into said second opening for receiving said food item mix.

15. The baker of claim 11, wherein said baker includes means for heating said baking member when the baking member is in its said baking position with said food item mix therein.

16. The baker of claim 15, wherein said baking member includes heating means within said inner shell part.

17. The baker of claim 15 wherein said baking member includes heating means within at least one of said first and second outer shell parts.

18. The baker of claim 15, wherein said pivot means includes passage means extending therethrough for receiving wiring means, said wiring means for conduction of an electrical current to said heating means and extending through said pivot means to the heating means.

19. The baker of claim 11 and a second said baking member supported upon said base in a side by side orientation with said first mentioned baking member.

20. The baker of claim 11 wherein said pivot means is shiftable in a vertical plane about another axis.

* * * * *